J. KENNEDY.
MANIPULATOR FOR ROLLING MILLS.
APPLICATION FILED MAR. 13, 1916.

1,220,754.

Patented Mar. 27, 1917.
4 SHEETS—SHEET 1.

WITNESSES
R A Balderson
J B Fleming

INVENTOR
Julian Kennedy
Bakewell, Byrnes, Parmelee
Attys.

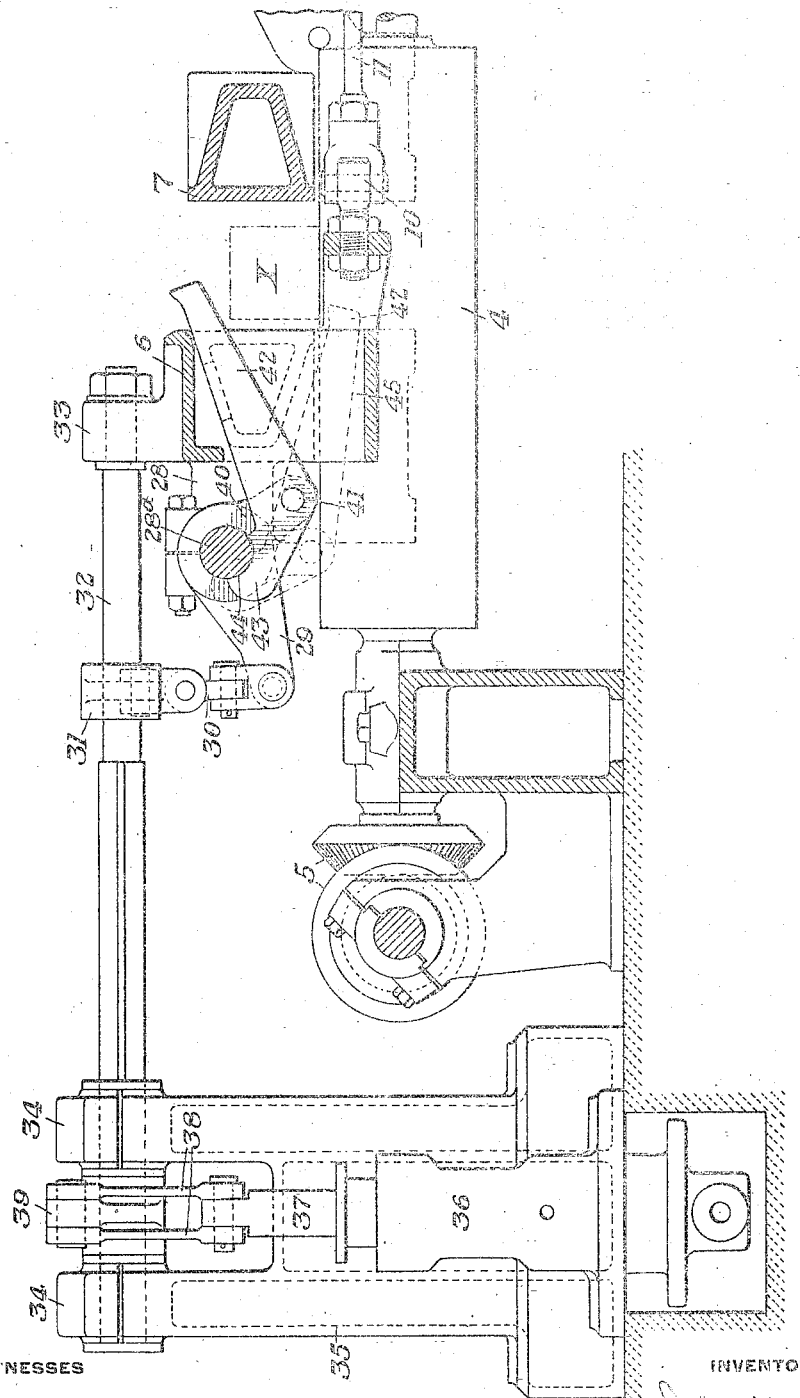

J. KENNEDY.
MANIPULATOR FOR ROLLING MILLS.
APPLICATION FILED MAR. 13, 1916.
1,220,754.
Patented Mar. 27, 1917.
4 SHEETS—SHEET 3.
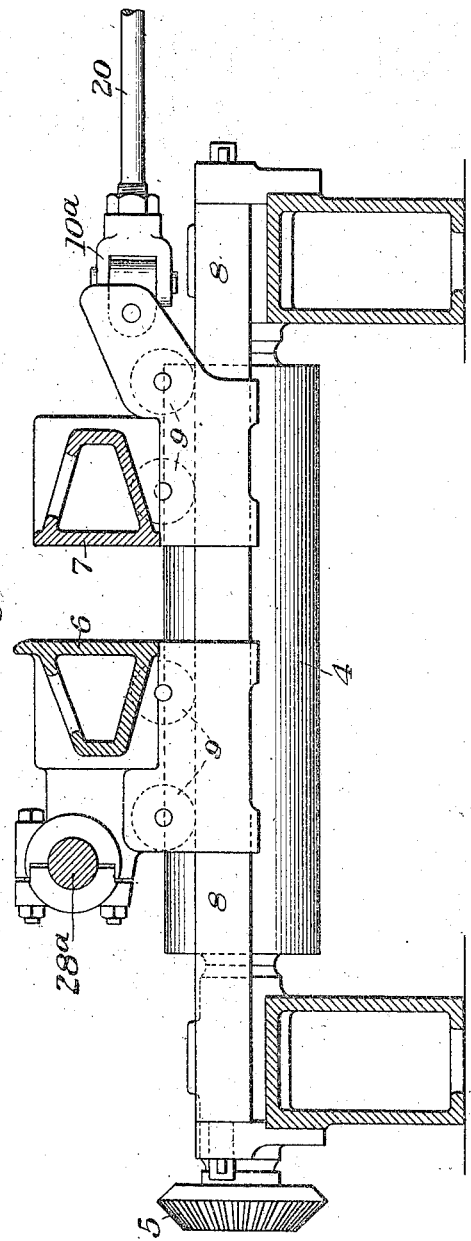
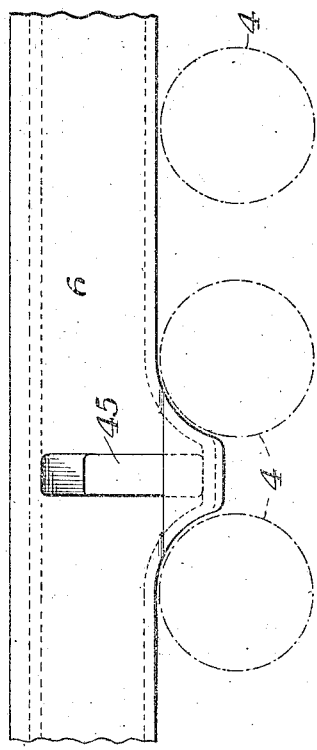

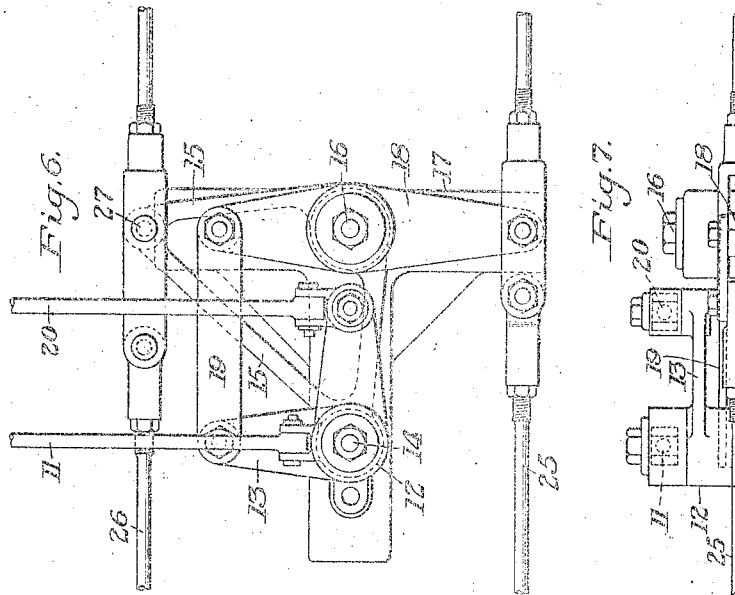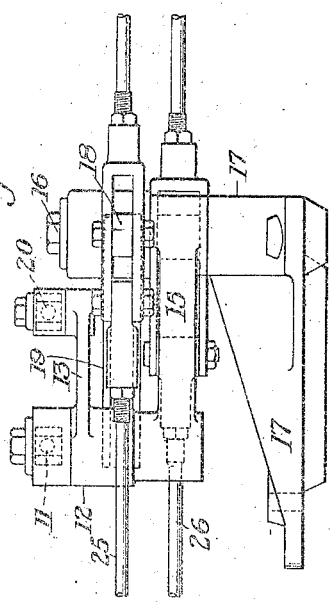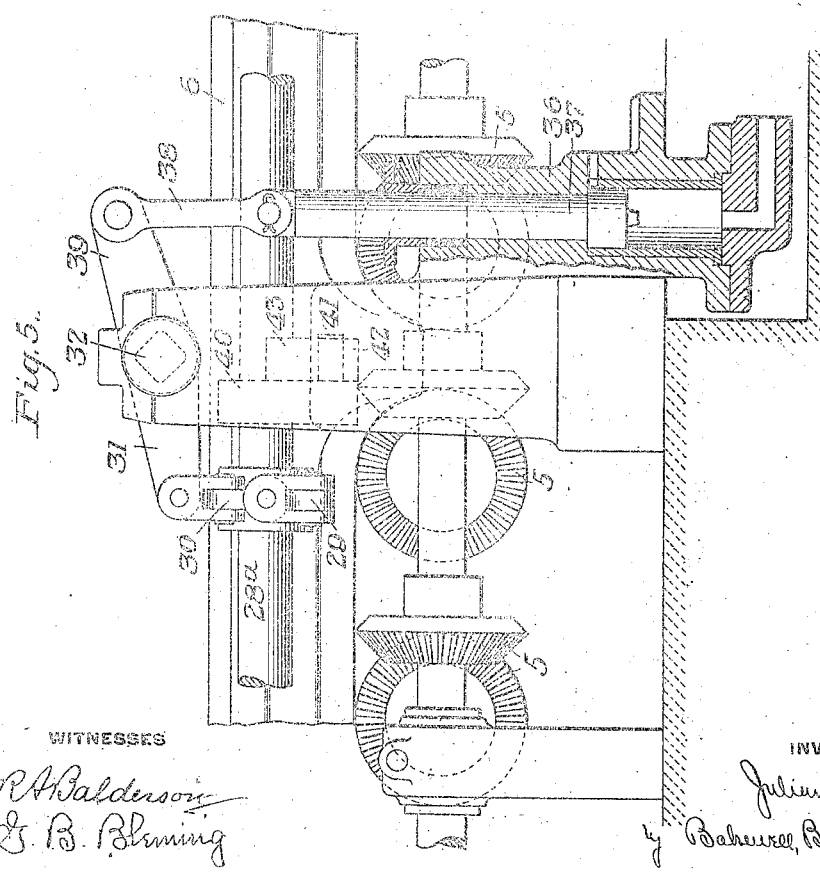

UNITED STATES PATENT OFFICE.

JULIAN KENNEDY, OF PITTSBURGH, PENNSYLVANIA.

MANIPULATOR FOR ROLLING-MILLS.

1,220,754.  Specification of Letters Patent.  Patented Mar. 27, 1917.

Application filed March 13, 1916. Serial No. 83,699.

*To all whom it may concern:*

Be it known that I, JULIAN KENNEDY, a citizen of the United States, residing at Pittsburgh, in the county of Allegheny and State of Pennsylvania, have invented a new and useful Improvement in Manipulators for Rolling-Mills, of which the following is a full, clear, and exact description, reference being had to the accompanying drawings, forming part of this specification, in which—

Figs. 2 and 3 are sectional views taken on the lines II—II and III—III, respectively, of Fig. 1, on a larger scale;

Fig. 4 is a detail view showing in side elevation a portion of one of the guides;

Fig. 5 is a view partly in section and partly in elevation of a portion of the mechanism for actuating the fingers; and Figs. 6 and 7 are plan and elevations, respectively, of a portion of the actuating connections for the manipulator guides.

Figure 1:
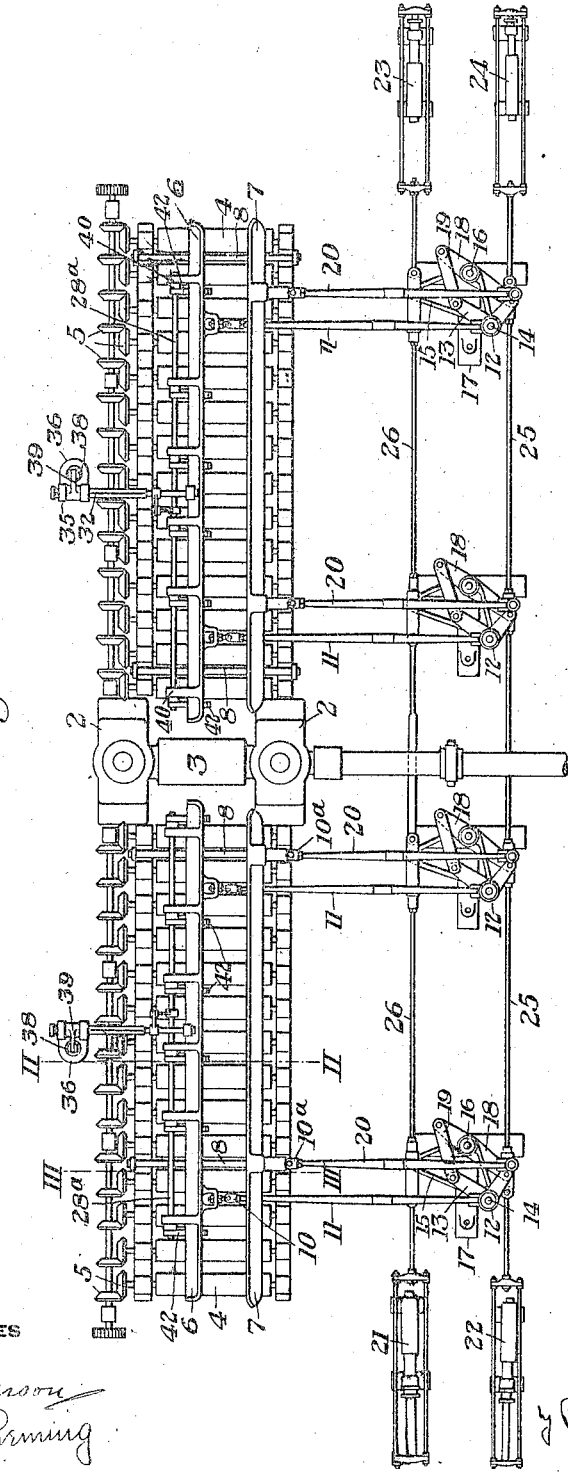
Figure 1 is a plan view, partially conventional, of a rolling mill having my improved manipulator applied thereto.

My invention has relation to manipulators for rolling mills, and is designed to provide a manipulator of simple, positive and efficient character and which is applicable to various types of rolling mills.

A more particular object of my invention is to provide novel means whereby the manipulator guides may be moved laterally of the table and lengthwise of the rolls into any desired position and may be readily adjusted with respect to each other and with respect to the piece being rolled.

A further object of my invention is to provide mechanism of improved character for operating the manipulator fingers.

The nature of my invention will be best understood by reference to the accompanying drawings, in which I have shown a preferred form thereof and which will now be described, it being premised, however, that various changes may be made in the details of construction and arrangement of the various parts, without departing from the spirit and scope of my invention as defined in the appended claims.

In these drawings, the numeral 2 designates the housings of a rolling mill, and 3 designates one of the rolls. 4 designates the tables at opposite sides of the rolls, which may be of any usual or desired type. I have illustrated the ordinary roller tables driven by the gears 5.

The numerals 6 and 7 designate the manipulator guides on one of the tables, there being similar guides 6 and 7 for the other table. The arrangement of guide and manipulator is the same for both tables, and a description of one will suffice for both, similar reference characters being applied to corresponding parts. The mechanisms for actuating the guides on the two tables are, however, connected so that both operations take place simultaneously on both tables.

Each pair of guides 6 and 7 is mounted for lateral movement on the transverse guide bars 8, being preferably roller-mounted, as indicated at 9. Connected to the guides 6 by means of universal joints 10 are two actuating rods 11. Each of these rods is connected at its opposite end to the hub portion 12 of a bell crank lever 13, which is pivoted at 14 upon one arm of a triangular lever 15, which is fulcrumed at 16 on a supporting bracket 17. Also mounted on the center 16 is a two-armed lever 18, having one arm connected by a link 19 with one of the arms of the bell crank lever 13. The other arm of each bell crank lever is connected by an actuating rod 20 at 10$^a$ with the guide 7.

21, 22, 23 and 24 designate four single-acting hydraulic motors. The motors 21 and 22 are located side by side at one end portion of the mill, while the motors 23 and 24 are similarly located at the opposite end of the mill. The two motors 22 and 24 are connected by a system of rods 25, which rods are also connected with those arms of the levers 18 which are opposite the ends of said levers to which the links 19 are connected. The two motors 21 and 23 are connected in a similar manner by the rods 26 which are also connected at 27 to the triangular levers 15.

By admitting power to the cylinder 21 and to the cylinder 23, the triangular levers 15 are all rocked on the centers 16 in one direction or the other, according to which cylinder is energized, thereby actuating the connecting rods 11 and 20 to move the guides 6 and 7 in one direction, the bell crank levers 13 being carried on and moving with the lever 15. At the same time, power may be admitted to either cylinder 22 or 24, to thereby rock the levers 18 on the center 16, and through the connections 19 and bell cranks 13 move the rods 20 to adjust the guide 7 with respect to guide 6; or either cylinder 22 or 23 may be operated independently of cylinders 21 and 23, at any time, to adjust the guides 7 laterally with respect to guides 6.

Each of the guides 6 has a plurality of projections 28, in which is journaled a manipulator shaft 28ª. Rigidly secured to this shaft is a crank arm 29, which has the universal joint connection 30 (see Fig. 2) with a hub portion of a lever arm 31, which is fixed on a rock shaft 32. This rock shaft is connected to a lug 33 on the guide 6, and is mounted to slide endwise in bearings 34 of a stand 35 as said guide is moved carrying with it the collar 31. 36 is a double-acting hydraulic cylinder, whose plunger 37 is connected by links 38, with a crank arm 39 on said shaft 32. The manipulator shaft 28ª has a plurality of crank arms 40, to each of which is pivoted at 41 a manipulator finger 42. Each of these fingers has an extension 43, back of its pivot 41, and such extension has a concavity 44 therein to fit a portion of the periphery of the shaft 28ª. The manipulator fingers 42 extend through slots or openings 45 in the guide 6 (see Figs. 2 and 4). In their normal lowered positions, the fingers are in the dotted position shown in Fig. 2, with their ends lying underneath and in position to catch and rotate the blank X, which is being rolled and which is between the guides 6 and 7. Power being admitted to the cylinder 36, the plunger 37 is actuated to rock the shaft 32, and thereby, through the connections described, the manipulator shaft 28ª. As this shaft is rocked, the crank arms 40 are moved from the positions shown in dotted lines to the positions shown in full lines in Fig. 2, thereby carrying the manipulator fingers forwardly through the openings in the guide 6; and by reason of the engagement of the heel portions of these fingers with the shaft 28ª, the fingers are caused to move upwardly as they are moved forwardly, thereby catching and turning the work piece. The plunger 37 is then reversed and the fingers moved back to the position shown in dotted lines in Fig. 2.

This movement of the manipulator fingers is an exceedingly simple and positive one, by reason of the provision of the fulcrum of their heel portions against the shaft 28ª, giving them a powerful lifting and turning action.

It will be obvious that many changes may be made in the details of construction and arrangement of the parts, without departing from the spirit and scope of the invention as defined in the appended claims. Thus, instead of hydraulic cylinders for operating the various parts, I may use any other suitable kind of motor; the details of the actuating connections between the motors and the movable parts may be varied, and numerous other changes may be made, limited only by the scope of the claims.

The particular description and arrangement of the manipulator herein shown and described forms the subject matter of my divisional application Serial No. 142,784, filed January 17, 1917.

I claim:

1. A manipulator for rolling mills, comprising a pair of laterally movable guides, connections for simultaneously moving both guides, and other connections for moving one of the guides relatively to the other, together with motive means for actuating said connections, substantially as described.

2. A manipulator for rolling mills, comprising a pair of laterally movable guides, separate actuating connections for each guide, motive means for simultaneously actuating the connections of both guides, and other motive means for separately actuating the connections of one of the guides, substantially as described.

3. In a manipulator for rolling mills, the combination with a pair of separately movable lateral guides, of lever members having actuating connections with both guides, and motive means whereby the actuating connections of both of the guides may be simultaneously moved and whereby the actuating connections of one of the guides may be independently moved, substantially as described.

4. In a manipulator for rolling mills, the combination with a pair of guides mounted for lateral movement, separate actuating connections for each guide, a lever member, a bell crank mounted on said lever member, and to which the actuating connections of both guides are attached, motive means connected to the first named lever member, a second lever member connected to the said bell crank, and other motive means connected to the second lever member, substantially as described.

5. A manipulator for rolling mills, comprising a pair of laterally movable guides, separate actuating connections for each guide, a plurality of lever mechanisms for simultaneously actuating the connections of both guides and for separately actuating the connections of one of the guides, connections between the several lever mechanisms, and motive means for actuating the last named connections, substantially as described.

In testimony whereof, I have hereunto set my hand.

JULIAN KENNEDY.

Witnesses:
FREDERICK MCCLAIN,
H. W. RANO.